Jan. 3, 1939.　　　　G. H. LELAND　　　　2,142,731
POSITION REVERSING DEVICE
Filed Sept. 21, 1936　　　2 Sheets-Sheet 1
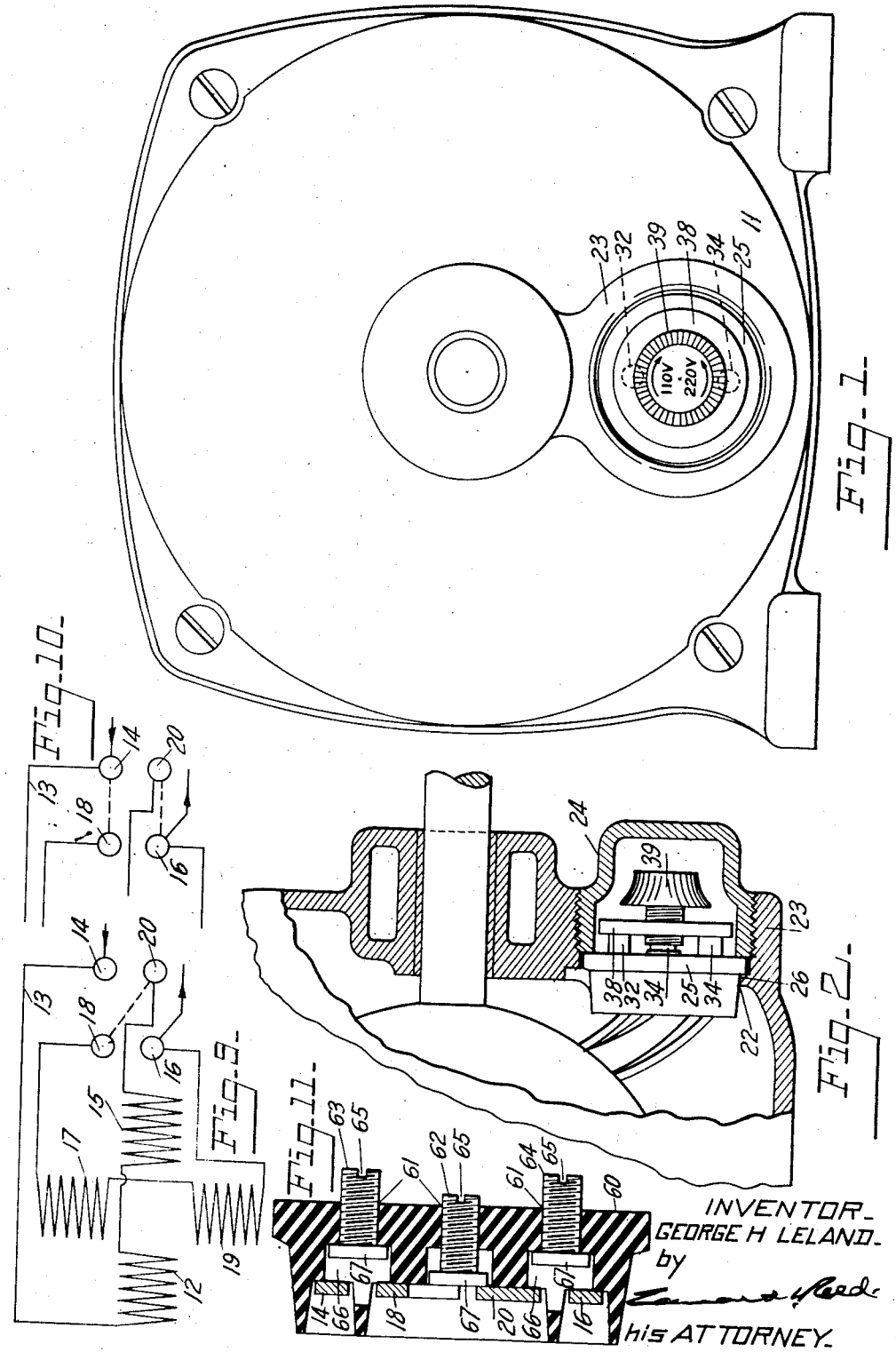
INVENTOR.
GEORGE H LELAND.
by
his ATTORNEY.

Jan. 3, 1939.                G. H. LELAND                2,142,731
                        POSITION REVERSING DEVICE
                        Filed Sept. 21, 1936            2 Sheets-Sheet 2
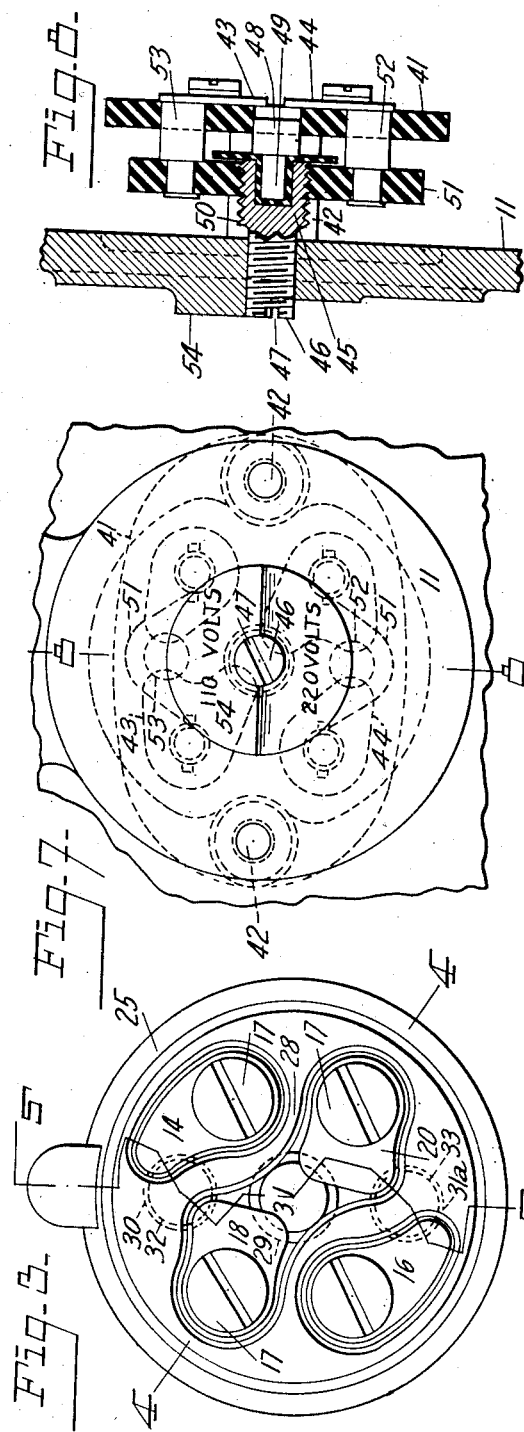
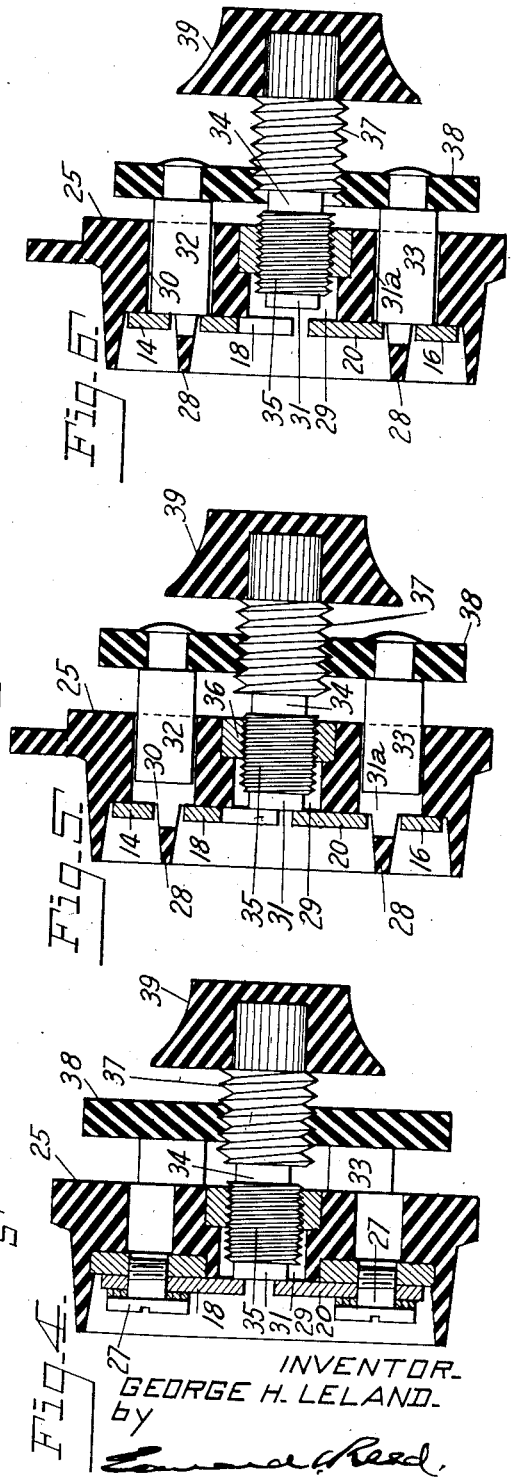
INVENTOR
GEORGE H. LELAND
by
Edward Reed
his ATTORNEY Patented Jan. 3, 1939

2,142,731

UNITED STATES PATENT OFFICE 2,142,731

POSITION REVERSING DEVICE

George H. Leland, Dayton, Ohio, assignor to The Leland Electric Company, Dayton, Ohio, a corporation of Ohio Application September 21, 1936, Serial No. 101,763

23 Claims. (Cl. 200—158)

This invention relates to a position reversing device and while it has been designed primarily as a circuit controlling device it may be used in connection with various apparatus where it is desired to move two parts substantially simultaneously in different directions.

One object of the invention is to provide a simple efficient device for simultaneously moving two elements in different directions.

A further object of the invention is to provide such a device comprising an actuating member, the rotation of which in one direction will move one element in one direction and the other element in the other direction.

A further object of the invention is to provide a circuit controlling device a single movement of which in one direction will open one circuit and close another and the movement of which in the opposite direction will open the last named circuit and close the first named circuit.

Many electric motors are capable of operating on a voltage of either 110 volts or 220 volts but in order to change from one voltage to the other the connections between the field windings and the source of power must be changed. When these windings are connected in parallel across the power source the motor is adapted to operate on 110 volts and when the windings are connected in series across the power source the motor is adapted to operate on 220 volts. The aforesaid connections are usually enclosed within the motor casing and it is often difficult to obtain access thereto and to effect the changes. Various expedients have been provided for facilitating the change of the winding connections, one of which is shown in Patent No. 1,951,877 granted to me March 20, 1934. While the device of that patent constituted a marked advance over the prior practice it nevertheless requires that the leads from the windings shall be detached from the terminals and then reattached in the changed locations.

A further object of the present invention is to provide a device with which the connections may be changed without detaching the leads from the terminals and which will prevent error in the changing of the leads and will make it impossible to improperly connect the windings.

A further object of the invention is to provide a device of this kind having two circuit breaking and closing devices and a single actuating member so connected with the two devices that when rotated in one direction it will establish one connection and break the other connection, and the movement of which will be positively stopped when the first mentioned connection has been established.

Other objects of the invention may appear as the apparatus is described in detail.

In the accompanying drawings Fig. 1 is a front elevation of a motor provided with my position changing mechanism; Fig. 2 is a longitudinal sectional view taken through the lower portion of the motor casing showing the invention applied thereto; Fig. 3 is a rear elevation of the reversing apparatus; Fig. 4 is a section taken on the line 4—4 of Fig. 3; Fig. 5 is a section taken on the line 5—5 of Fig. 3, showing the windings connected in series; Fig. 6 is a section similar to Fig. 5 showing the windings connected in parallel; Fig. 7 is a rear elevation of a modified form of the apparatus; Fig. 8 is a section taken on the line 8—8 of Fig. 7; Fig. 9 is a circuit diagram showing the windings connected in series; Fig. 10 is a portion of such a diagram showing the circuits connected in parallel; and Fig. 11 is a sectional detail view of another modified form of the apparatus.

In these drawings I have illustrated one embodiment of my invention and have shown the same as applied to an electric motor for the purpose of reconnecting the field windings but, as heretofore stated, the apparatus, either in the form here shown or in a modified form, may be used for various purposes where it is desired to simultaneously move two elements in different directions.

The motor to which the invention is applied comprises a casing 11 within which are arranged the stator windings. As shown in Fig. 9 these windings are arranged in pairs; the winding 12 being connected by a conductor 13 with a terminal 14 and being connected with the winding 15 which is connected with the terminal 20. The winding 17 is connected with the terminal 18 and with the winding 19 which in turn is connected with the terminal 16. The power line is connected with the terminal 14 and with the terminal 16, as shown at 21 in Fig. 9. When the terminal 18 is connected with the terminal 20, as shown in Fig. 9, the several windings are connected in series across the power source and the motor is adapted to operate on 220 volts. When the terminal 14 is connected with the terminal 18 and the terminal 20 is connected with the terminal 16, as shown in Fig. 10, the windings are connected in parallel across the power source and the motor is adapted to operate on 110 volts.

The device for changing the connections between the windings may be mounted in any suitable manner on the casing but it is preferable, particularly when the casing is a sealed casing, that the connections shall be arranged within the casing so that an explosion proof enclosure may be provided. As shown in Fig. 2 the casing 1 is provided in its end wall with an opening 22 which is surrounded by a housing comprising a flange 23 and a removable cap 24. Mounted within the housing and extending through the opening 22 is a terminal block 25 which is clamped against a flange 26 by means of the cap 24 which is screw threaded into the housing and is hollow to receive the projecting portions of the device for changing the connections. The several terminals 14, 16, 18 and 20 are mounted on the inner side of the terminal block 25 and each terminal comprises a contact plate and a screw 27 which secures the contact to the terminal block and also serves as a binding post for connecting the conductor with the contact. The several contacts are preferably arranged in recesses formed in the face of the block and separated one from the other by walls 28. The several recesses may be wholly separated one from the other or they may be in communication one with the other but so arranged as to prevent the contacts from coming into engagement one with the other. As here shown, the contacts 18 and 20 are mounted in a single elongated recess with their adjacent ends spaced one from the other but overlapping a longitudinal bore 29 in the terminal block. The contact 14 is mounted in a recess entirely separate from the recess containing the terminal 18 but these two recesses communicate with and the contacts 14 and 18 overlap a longitudinal bore 30 in the block, and the contacts 16 and 20 also overlap a longitudinal bore 31a in the block.

The movable elements, the positions of which are to be reversed, comprise movable contactors 31, 32 and 33 mounted respectively in the longitudinal bores, 29, 30 and 31a, and are adapted to respectively engage the contacts which overlap the ends of said bores to electrically connect the same. The contactors 32 and 33 are connected together for movement in unison and constitute one of the movable elements, while the contactor 31 constitutes the other element.

The two elements are actuated in such a manner that when one element moves into circuit closing position the other element will be withdrawn from its circuit closing position. For this purpose I prefer to employ an elongate actuating member 34 which is rotatably mounted on the terminal block 25, which constitutes a support therefor, and is provided with means whereby the rotation of the actuating member will impart longitudinal movement thereto. In the present construction the actuating member is provided with a screw threaded portion 35, having a thread of a relatively low pitch, which is mounted in a screw threaded bushing 36 rigidly mounted in the enlarged outer end of the bore 29 in the block 25. Obviously upon the rotation of the actuating member the screw threaded portion 35 thereof will travel in the bushing 36 and thus impart axial movement to the actuating member. The movable element or contactor 31 is so connected with the actuating member that it will move therewith and, in the present construction, it is rigidly secured to the inner end of the actuating member and may, if desired, be formed integral therewith, so that the longitudinal movement of the actuating member will move the contactor 31 into or out of engagement with the contacts 18 and 20, depending upon the direction of movement of the actuating member. The second movable element, comprising the contactors 32 and 33, is so connected with the actuating member that the rotation of the latter will move the contactors into and out of engagement with their respective contacts and will cause the same to move in a direction opposite to the direction of movement of the contactor 31, so that when the actuating member is rotated in one direction the contactor 31 will be moved to circuit closing position and the contactors 32 and 33 will be moved out of circuit closing position and when the actuating member is rotated in the other direction the contactor 31 will be moved out of circuit closing position and the contactors 32 and 33 will be moved into circuit closing position. This movement of the second element is preferably accomplished by providing the actuating member with a second screw threaded portion 37 having a thread of a relatively high pitch but turned in the same direction as the thread 35. The contactors 32 and 33 are carried by an insulating member 38 and this member is provided with a central screw threaded opening through which the screw threaded portion 37 of the actuating member extends. The member 38 is held against rotation by the engagement of the contactors 32 and 33 with their respective bores and consequently that member will travel lengthwise of the actuating member when the latter is rotated. The actuating member may be rotated in any suitable manner, as by providing the same with a knob 39 or by providing a kerf in the outer end of the member to receive the bit of a screw driver, as shown in Fig. 8.

With the parts in the position shown in Fig. 5 the contactor 31 is in engagement with the contacts 18 and 20 and the actuating member is held against further inward movement. By rotating the actuating member in a reverse direction the screw 35 will be caused to travel outwardly in the bushing 36, thus moving the contactor 31 out of engagement with the contacts 18 and 20. The screw threaded portion 37 of the actuating member will, of course, move outwardly with that member but owing to the relatively high pitch of the thread 37 the member 38 and the contactors carried thereby will be caused to move inwardly at a rate in excess of the rate at which the actuating member moves outwardly and the contactors 32 and 33 will therefore be moved into engagement with their respective contacts and when such engagement has been established the movement of the actuating member is positively interrupted and the parts retained in the position shown in Fig. 6 until the actuating member is again rotated in the opposite direction. The screw 35 is preferably provided with just twice as many threads per inch as is the screw 37, thus causing the contactors 32 and 33 to move the same distance that the contactor 31 is moved, but in the opposite direction.

As shown in Fig. 2 the reversing device is mounted within the housing carried by the casing 11 and is accessible only by removing the screw threaded cap 24. If desired, the apparatus may be so arranged within a sealed casing that it will be operable from the exterior of the casing without removing any part of the latter and without breaking the seal of the casing. As shown in Figs. 7 and 8 the terminal block 41 is supported within the casing 11 by studs 42 and carries the several terminals, two of which are shown at 43 and 44. The actuating member 45 has its outer portion screw threaded, as shown at 46, and mounted in a threaded opening in the wall of the casing, the outer end of this actuating member being provided with a kerf 47 to receive the bit of a screw driver. The contactor 48 is formed separately from the actuating member and is rigidly connected with but insulated from the same, as shown at 49. The actuating member is provided with an inner screw threaded portion 50 having a thread of a pitch substantially higher than the thread 46, and the member 51, which carries the contactor 52 and 53, is mounted on this inner threaded portion of the actuating member. Thus by rotating the actuating member the contactor 48 is moved in one direction and the contactors 52 and 53 are moved in the opposite direction. To indicate the position of the contactors I have shown that portion of the casing wall 11 which lies above the actuating member 45, as projecting outwardly beyond the lower portion of that wall, as shown at 54, and the actuating member is of such length that when it is moved outwardly to connect the windings in parallel the outer end thereof will be substantially flush with the upper portion of the wall 11 and when the actuating member is moved inwardly to connect the windings in series the outer end of the actuating member will be substantially flush with the lower surface of the wall.

In both forms of the apparatus heretofore described the contactors have been moved in opposite directions by a single actuating member to establish the desired circuit connections between the terminal contacts. It will be obvious that the several contactors may, if desired, be mounted for separate movement into and out of circuit closing position and in Fig. 11 I have shown an arrangement whereby this may be accomplished. As there shown, the terminal contacts 14, 16, 18 and 20 are arranged in the same relation as shown in Figs. 4 to 6 and are carried by a terminal block or supporting member 60 having longitudinal bores 61 in line with the respective terminal contacts. Contactors 62, 63 and 64 are mounted in the respective bores 61 for separate movement into and out of circuit closing position. Screw threaded means are provided for actuating each contactor and, in the present arrangement, each contactor has separate screw threaded connection with the terminal block and is provided at its outer end with means for rotating the same, such as the kerf 65. The inner portion of each bore 61 is provided adjacent the respective terminal contacts with an enlargement to provide a recess 66 and the contactors are provided with heads 67 arranged in the respective recesses and adapted to engage the outer walls of the recesses to limit the outward movements of the contactors, the inward movement of the contactors being limited by their engagement with the terminal contacts. With this arrangement the contactors may be actuated selectively by their screw threaded means to establish the desired connections between the terminal contacts but this requires three separate operations and the device embodies no means to positively prevent all three contactors from engaging their respective terminal contacts at the same time and hence it is not fool proof, as are the other forms of the apparatus. It is, however, more simple in construction and less expensive to produce.

While I have shown and described one embodiment of my invention, together with minor modifications thereof, I wish it to be understood that I do not desire to be limited to the details thereof as various modifications may occur to a person skilled in the art.

Having now fully described my invention, what I claim as new and desire to secure by Letters Patent, is:

1. In an apparatus of the character described, an actuating device capable of two simultaneous movements in different directions, means for imparting one of said movements to said actuating device, means controlled by said movement of said actuating device for imparting the other movement thereto, and two elements connected with said actuating device for movement in different directions by the respective movements of said actuating device.

2. In an apparatus of the character described, an actuating device, means for simultaneously imparting rotary movement and longitudinal movement to said actuating device, and two movable elements so connected with said actuating device that one element will be moved in one direction by the longitudinal movement of said actuating device and the other element will be moved in the opposite direction by the rotary movement of said actuating device.

3. In an apparatus of the character described, a supporting member, a rotatable actuating member, means for rotating said actuating member, means for so connecting said actuating member with said supporting member that the rotation of said actuating member will impart axial movement thereto with relation to said supporting member, an element arranged to be moved in one direction by the axial movement of said actuating member, a second element, and means actuated by the rotation of said actuating member to move said second element in a direction different from the direction of movement of the first mentioned element.

4. In an apparatus of the character described, a plurality of elements mounted for differentiated parallel movements, and a screw threaded actuating member having two groups of threads turned in the same direction and of different pitch, said groups of threads acting on the respective elements to impart differentiated parallel movements thereto.

5. In an apparatus of the character described, a structure having stationary stops, two elements mounted for movement to and from the respective stops, and a differentially threaded member mounted on said structure for axial movement thereon, and acting on said elements to move one of said elements into engagement with one of said stops and to move the other of said elements out of engagement with the other of said stops.

6. In an apparatus of the character described, a stationary member, a rotatable actuating member having screw threaded connection with said stationary member to impart longitudinal movement to said actuating member, an element connected with said actuating member for movement in one direction by the longitudinal movement of said actuating member, and a second element having screw threaded connection with said actuating member for movement thereby and with relation thereto in another direction, whereby the rotation of said actuating member will move said elements simultaneously in different directions.

7. In an apparatus of the character described, a supporting member, a rotatable actuating member having screw threaded connection with said supporting member to impart axial movement thereto, an element connected with said actuating member for movement thereby in the direction of its axial movement, a non-rotatable element, and a screw threaded connection between said non-rotatable element and said actuating member, the screw threads of said connections being turned in the same direction and the thread of one connection having a higher pitch than the thread of the other connection.

8. In an apparatus of the character described, a supporting member, a rotatable actuating member provided with two screw threaded portions having threads of different pitch, that portion having the lower pitch thread being mounted in said supporting member to impart axial movement to said actuating member, an element connected with said actuating member for movement thereby in the direction of its axial movement, and a second element having a part mounted on that portion of said actuating member having the higher pitch thread and held against rotation therewith, whereby the rotation of said actuating member will cause said elements to move in opposite directions with relation to said supporting member.

9. In a circuit controlling device, a plurality of contacts, a movable element to open and close the circuit through a part of said contacts, a second movable element to open and close the circuit through another part of said contacts, and an actuating device mounted for simultaneous movements in two directions and so connected with said movable elements that one of said movements will move one element to circuit closing position and the other of said movements will move the other element to circuit opening position.

10. In a circuit controlling device, a plurality of contacts, a movable element to open and close the circuit through a part of said contacts, a second movable element to open and close the circuit through another part of said contacts, a rotatable actuating device, and means controlled by the rotation of said actuating device to move one of said elements to circuit opening position and to move the other of said elements to circuit closing position when said device is rotated in one direction and to move the first mentioned element to circuit closing position and the last mentioned element to circuit opening position when said actuating device is rotated in the other direction.

11. In a circuit controlling device, a plurality of contacts, a movable element to open and close the circuit through a part of said contacts, a second movable element to open and close the circuit through another part of said contacts, a rotatable actuating device having means controlled by the rotation thereof to impart longitudinal movement thereto, one of said elements being connected with said actuating device for longitudinal movement therewith, and means actuated by the rotation of said actuating device to move the other of said elements in a direction opposite the direction of movement of the first mentioned element.

12. In a circuit controlling device, a plurality of contacts, a movable element to open and close the circuit through a part of said contacts, a second movable element to open and close the circuit through another part of said contacts, a stationary support, a rotatable actuating device having screw threaded connection with said support to impart axial movement to said actuating device, one of said elements being connected with said actuating device for movement by the axial movement of the latter, and a screw threaded connection between the other of said elements and said actuating device to cause the rotation of said actuating device to move the last mentioned element in a direction opposite the direction of movement of the first mentioned element.

13. In an apparatus for controlling a plurality of circuits, a stationary support, a plurality of contacts in said circuits mounted adjacent to said support and adapted to be connected one with the other to connect said circuits either in series or in parallel, a rotatable actuating member having screw threaded connection with said support to impart axial movement to said actuating member, a device actuated by the axial movement of said actuating member to so connect said contacts that said circuit will be connected in series, a second device to so connect said contacts that said circuits will be connected in parallel, and a screw threaded connection between said second device and said actuating member to cause the rotation of said actuating member to move said second device in a direction opposite the direction of movement of the first mentioned device.

14. In an electric switch or the like, a plurality of terminal contacts to be interconnected in different selected combinations, a screw element adapted to be rotated in either direction and having screw threads of different pitch, and means controlled by the rotation of said element to different positions to establish said different combinations of connections.

15. In an electric switch or the like, a stationary element, contact elements movable in parallel directions to different positions relative to said stationary element, and a screw threaded element having threads of differing pitch, said threads co-acting respectively with said stationary element and said contact elements to control their relative positions.

16. In a device of the character described, a stationary element, a plurality of elements movable with relation to said stationary element, and a differentially threaded screw element co-acting with said stationary element and movable elements to locate said movable elements in different selected positions with relation to said stationary element.

17. In an electric switch or the like, terminal contacts of the order of 1, 2, 3 and 4, a stationary element supporting said contacts, an element movable with relation to said stationary element, and an actuating screw having multiple threads of different pitch and co-acting with said stationary element through the medium of a lower pitch thread when rotated in one direction to close an electric circuit through the terminal contacts 2 and 3, said screw also co-acting with said movable element through the medium of a higher pitch thread when rotated in the opposite direction to close electric circuits between terminal contacts 1 and 2 and between terminal contacts 3 and 4.

18. In an electric switch or the like, stationary terminal contacts of the order of 1, 2, 3 and 4, a stationary element supporting said terminal contacts, movable contacts adapted to selectively close circuits between 1 and 2 and 3 and 4 at one time, or between 2 and 3 at another time, a differentially threaded screw co-acting with said stationary element and said movable contacts to close said circuits between 1 and 2 and between 3 and 4 at one time, when rotated in one direction, and to close said circuit between 2 and 3 at another time when rotated in the opposite direction.

19. In an electric switch or the like, a plurality of circuits to be alternately closed and opened, a differentially threaded screw rotatably mounted on a fixed part of said switch, and means actuated by said screw to close one circuit and open another circuit when said screw is tightened in one direction and to open the first mentioned circuit and close the last mentioned circuit when said screw is tightened in the opposite direction.

20. In an electric switch or the like, a plurality of terminals, contactors to connect said terminals in alternate selected combinations, a screw rotatably mounted on a stationary part of said switch and having screw threads of different pitch, and means actuated by said screw to effect screw tightened contact between certain of said contactors and terminals to establish one selected combination when said screw is rotated to the limit of its movement in one direction, and to effect screw tightened contact between other of said contactors and terminals to establish another selected combination when said screw is rotated to the limit of its movement in the other direction.

21. In an apparatus for controlling a plurality of circuits, terminals for said circuits, a plurality of contactors arranged to engage selected terminals to connect said circuits either in series or in parallel, and screw threaded means for selectively actuating said contactors to establish the desired connection between said circuits.

22. In an apparatus for controlling a plurality of circuits, a plurality of contacts in said circuits adapted to be connected one with the other to connect said circuits either in series or in parallel, movable devices cooperating with said contacts for controlling the series and parallel connections between said circuits, an actuating member movably supported on a fixed part of said apparatus and so connected with said controlling devices that the movement of said actuating member in one direction will move said controlling devices in opposite directions.

23. In an electrical apparatus comprising a casing, a plurality of contacts arranged within said casing, and adapted to be connected one with the other either in series or in parallel, a rotatable actuating member having a screw threaded portion mounted in the wall of said casing to impart axial movement to said actuating member, a contactor connected with said actuating member for movement thereby in the direction of its axial movement to control the series connection between said contacts, said actuating member having a second screw threaded portion arranged within said casing and provided with a thread of higher pitch than the thread of the first mentioned screw threaded portion, a member mounted on said second screw threaded portion for movement lengthwise of said actuating member by the rotation of the latter, and contactors connected with the last mentioned member and operable thereby to control the parallel connections between said contacts, the screw threaded connections of said actuating member with said casing and said last mentioned member being so arranged that said contactors will move simultaneously in opposite directions.

GEORGE H. LELAND.